Dec. 6, 1960 H. REDLICH 2,963,556

APPARATUS FOR SOUND RECORDING

Filed March 26, 1958 4 Sheets-Sheet 1

Inventor:
HORST REDLICH
BY [signature]
PATENT AGENT

Dec. 6, 1960 H. REDLICH 2,963,556

APPARATUS FOR SOUND RECORDING

Filed March 26, 1958 4 Sheets-Sheet 2

Inventor:
HORST REDLICH

BY [signature]

PATENT AGENT

Dec. 6, 1960 H. REDLICH 2,963,556

APPARATUS FOR SOUND RECORDING

Filed March 26, 1958 4 Sheets-Sheet 3

Inventor:
HORST REDLICH
BY [signature]
PATENT AGENT

Dec. 6, 1960 H. REDLICH 2,963,556

APPARATUS FOR SOUND RECORDING

Filed March 26, 1958

4 Sheets-Sheet 4

Inventor:
HORST REDLICH
BY [signature]
PATENT AGENT 2,963,556
Patented Dec. 6, 1960

2,963,556

APPARATUS FOR SOUND RECORDING

Horst Redlich, Berlin-Steglitz, Germany, assignor to Teldec - Telefunken - Decca Schallplatten G.m.b.H., Hamburg, Germany Filed Mar. 26, 1958, Ser. No. 724,178

Claims priority, application Germany Mar. 26, 1957

5 Claims. (Cl. 179—100.4)

The present invention relates to a method for recording sound and to apparatus for carrying out the method by engraving sound tracks into a record receiving medium. In particular, the invention relates to recording of parallel sound tracks on disks or tapes, the playback of which may be accomplished with a needle.

It is customary in the art to move the recording stylus in a direction which is perpendicular to the groove being formed and parallel to the surface of the record receiver in such a manner, that the space occupied by the groove will be fully utilized with very little waste. Early in the art of sound recording, it was conventional to maintain a constant relative speed between the cutting stylus and the groove being formed thereby. If the disk was a rotating circular plate, the sound groove had the general shape of an Archimedes spiral. The distance between two adjacent grooves was so proportioned as to avoid contact between juxtaposed edges of the adjacent grooves, even when the recorded signal was of high amplitude. It became apparent that considerable space could not be used, due to the relatively great average distance between adjacent grooves. This was especially true when the recorded signal was primarily of low amplitudes with but few high amplitude passages.

It has been known to those skilled in the art to move the recording stylus transversely of the groove in amounts proportional to the amplitudes of the signals being recorded in lateral tracks. In such recording, the transverse speed of the recording stylus with respect to the groove increases with the amplitude of the signal being recorded because of the greater distance it must travel, due to the greater average deviations produced by a high amplitude signal. It is to be understood that throughout this disclosure, the recording track is cut as a continuous groove.

In addition, this application considers the deviations of the average trace of the recording groove from an Archimedes spiral not only absolutely, but also with respect to the preceding recorded revolution of the trace. Because of this, the speed of the stylus perpendicular to the groove is twice controlled: once by the amplitude of the signal itself, and once by the amplitude of a signal representing the preceding track. To perform such recording, it is often necessary to use a memory device for storing the signals recorded in the preceding revolution and then reproducing those signals at the appropriate time for controlling the cutting of the groove. A magnetic tape may be used as such a storage means. The signal to be recorded is stored on the tape and the signals which control the amplitude of the cut are then taken from two different points on the tape: one point being that at which the signal to be recorded is stored, and the other point being at a distance equivalent to a revolution of the disk preceding the one point. From another point of view, the second point, which serves to control the movement of the stylus, is selected in such a manner, that at a later time corresponding to one revolution of the disk the signal from this point will be recorded on the disk. The control signals are formed by proper amplification and rectification, as is well known in the art. These control signals are then used to govern the speed of the stylus drive.

In another known method of recording sound, the depth of cut of the stylus is controlled. The depth of the lateral track is determined by the amplitude of the signal to be recorded, one such system of recording causing the penetration of the stylus to increase immediately before increased amplitude signals are recorded, thus improving the tracking qualities of the playback stylus over portions of the record containing high amplitude signals. On the other hand, on those portions of the record medium having low level recorded signals, the space between grooves is maintained sufficiently to provide adequate tracking. The average space between grooves is diminished, saving space on the record medium. A recording device is disclosed in British specification 770,465, in which the distance between two grooves is regulated in accordance with the depth of penetration of the stylus; the regulation being adjusted so that the distance between grooves increases with the depth of penetration.

The above mentioned systems, as they are presently practiced, are all related to recordings which have only lateral record grooves. The deflections of the stylus are in the same direction as the general drift of the stylus along the disk with respect to the edge. This general drift of the stylus is from the edge towards the center forming a spiral on the surface of the disk. The space necessary to record a signal of high amplitude is of great importance; the utilization of the limited space available on the surface of a disk for recording could be considerably improved by the employment of the methods of recording mentioned above.

Other proposals made prior to this invention include the recording of sound in tracks having two recorded signals, each signal being perpendicular to the other and both signals being recorded in a common plane which is perpendicular to the track. In such recording techniques, the recording stylus is subjected to two different modes of movement. According to the recording procedures suggested above, the distance between the center lines of two adjacent tracks is determined by two components, each component having two subcomponents. The two subcomponents of one of the components are proportional to the amplitudes of the signals to be recorded. The subcomponents of the other component are related to the signals recorded in the adjacent prior track. This type of recording has particular utility in the making of stereophonic records.

In the recording technique just discussed, the speed of the recording stylus is simultaneously determined by the two signals to be recorded. The control of the stylus is so proportioned as to obtain the most efficient use of the space available for recording. The recording stylus is wedge-shaped and the space between grooves must be considered for vertical recording, since the width of the groove cut for vertical recording increases with the amplitude of the vertical movement of the stylus. Accordingly, the required space for a record track of superimposed vertical and lateral recordings is additive with respect to the signals amplitudes.

According to another process of sound recording, a lateral track to be scanned photoelectrically may be produced by mechanical means. The track itself is recorded on a special tape composed of a base which is transparent to light and which has an opaque cover layer. The sound track is made by cutting a path through the opaque layer uncovering the transparent base. The sound recording appears as a transparent curve which may be scanned by photoelectric means for playback. In recording by this method, it is customary to mechanically scan the surface of the opaque layer to determine its thickness immediately adjacent the recording stylus. The thickness feeler is mechanically coupled to the stylus to regulate the depth of cut, so as to maintain an approximately uniform depth of penetration. The utilization of such a mechanical adjustment of the recording stylus is usually limited to those cases, where the surface of the material to be cut is relatively hard. It is necessary that the surface material be relatively hard to avoid injury to the base when the stylus is subjected to a force in response to the measurements of the thickness feeler. Soft wax matrices used for sound recordings of high quality are not suitable for this method of recording. (See further U.S. Patent 2,086,923 to P. E. Bonneau.)

It is, therefore, an object of the present invention to provide an improved method for the recording of sound in grooves, where either one or two signals are to be simultaneously recorded.

It is another object of this invention to provide an improved method for recording stereophonic sound signals.

It is a further object of this invention to provide a new control for the average depth of penetration of a cutting stylus, the control of the penetration being proportional to the amplitude of a vertically recorded signal. The average depth of penetration means the depth of penetration of the stylus in its rest position, i.e., the zero line of the stylus oscillatory movement. This average depth of penetration is approximately linearly proportional to the amplitude of the signal to be recorded, i.e., proportional thereto plus a constant.

It has been found that not only the above-mentioned factors influence the use of the available lateral recording space required for a sound track, but that there are additional factors to be considered for the proper control of the speed of the average movement of the recording stylus along the record carrier. One important factor, for example, is the depth of penetration of the stylus in its rest position. (Rest position is intended to mean the zero line of the vertical deflection of the stylus.) If this depth of penetration is large, the groove will have a large width at the surface of the recording medium. If the depth of the penetration increases, the width of the groove also increases. Consequently, the wider the groove, the greater the speed of the stylus perpendicular to the average trace of the groove.

At present, the most common types of record disks carry microgrooves having very small widths, thus saving considerable space on the record. To approach the lower limit of the width of the grooves and of the depth of penetration, the problems of inaccuracies in the rotation of the disk become important. It is always necessary to consider the vertical deviations of the disk during its rotation. Consequently, the depth of penetration of the stylus in its rest position may be selected for optimum conditions on only one half of the disk, the other half of the disk, because of the variations in the rotation of the disk, requiring that the average penetration be greater than optimum for positive tracking on playback.

It is a further object of this invention to provide compensation for inaccuracies in the rotation of the record medium. Such compensation is important not only for lateral recordings, but also for vertical recordings.

It is a still further object of the invention to provide a control for the zero or rest position of the recording stylus in spite of variations in the vertical positioning of the recording medium due to its rotation. This control may be carried out in such a manner, that the surface of the rotating medium may be scanned by an electro mechanical means to control the average depth of penetration of the stylus. In this manner, the average penetration of the stylus becomes independent of the vertical variations of the record medium. A very small force upon a mechanical feeler may be all that is necessary to actuate full control of the recording stylus depth of cut. If only a light touch on a feeler is necessary, soft materials may be used for the record medium without damage thereto. Electro mechanical means may be utilized for the control of energy sources which are independent of the force system of the feeler of the record. Consequently, the fairly large masses of the stylus and the stylus driving means may be accelerated with forces sufficiently high to accomplish the necessary results in the event of rapid amplitude changes.

The recording stylus, according to this invention, is controlled so that the average depth of penetration in accordance with the amplitude is adjusted, whereby a playback stylus will be guided safely in the groove which always has a certain minimum depth. In practice, the momentary depth of penetration of the cutting stylus may never become less than a minimum depth, even though the amplitude of the recorded signal is above or below predicted values. It should be borne in mind that high signal amplitudes to be vertically recorded effect the depth of penetration by changing the depth of the groove between two depths, i.e., to be very deep and very shallow. The shallow portions are the ones which cause the difficulty in tracking during playback. The present invention insures that the shallow portions of the grooves never get below a minimum depth. Without control of depth of penetration, the average depth of penetration of the cutting stylus is dependent solely upon the amplitude of the signal being recorded, and the resulting average depth in the zero or rest position of the stylus must be adjusted to an unnecessarily large value to insure that it never decreases below the minimum depth necessary for proper playback. As has been indicated above, the width of the groove is also proportional to the depth of penetration. Hence, an unnecessarily large depth increases the space occupied by each groove. The method of this invention remedies this wasted space by controlling the average depth of penetration of the cuuting stylus in respect to the signal amplitude. In the practice of this invention, the depth of penetration of the cutting stylus at the moment immediately preceding the beginning of the recording may be maintained very low, and the automatic control follows immediately upon the commencement of the recording to insure proper depth of cut.

As mentioned above, the average depth of penetration of the cutting stylus may also be made independent of the vertical deviations of the disk during rotation. It has been found advantageous to employ an electro mechanical transducer for sensing vertical deviations of the recording medium. For example, a feeler may touch the surface of the disk adjacent to the point at which the stylus is recording and generate an input signal for the control means to keep the stylus independent of the deviation. The average depth of cut of the recording stylus is to be under the control of the signal amplitude of the recording signal. This control may be carried out by deriving a control signal from the source of the signals to be recorded, for example, an intermediate record carrier. This control signal may be obtained by rectification. The output of the rectifier is a direct voltage proportional to the amplitude of the signal to be recorded. The direct control voltage now may be used for controlling the average depth of penetration of the recording stylus.

It should also be mentioned that the depth of cut of the recording stylus may be controlled by both the measurement of the vertical deviations of the disk during rotation and also the amplitude of the signal which is to be recorded. The two respective control signals may be superimposed in different proportions. The composite superimposed signals may then control a means for adjusting the distance between the stylus head and the disk upon which the recordings are being made.

The relationship between the average depth of penetration of the stylus into the sound track medium and the space necessary for the groove in a direction perpendicular to the center line of the groove has already been brought out. Because of this relationship, the speed of the recording stylus in the direction perpendicular to the center line of the groove should also be controlled by the amplitude of the vertical signal to be recorded. This control should be effective in addition to the controls outlined above. The signals for controlling the average depth of penetration of the stylus may thus be utilized for also controlling the distance between two adjacent grooves or, more particularly, for controlling the distance between the center lines of two adjacent grooves measured along a radius of the disk upon which the grooves are being cut. This control may be carried out such, that the distance mentioned above is approximately a linear relationship with the average depth of penetration.

This invention has great utility not only where the recording of sound is limited to only a single signal in a groove, but also where the same groove is used for simultaneously recording signals, both in vertical disposition and in lateral disposition. Such recordings have found great use in the field of stereophonic sound recording.

In stereophonic sound recording, it becomes necessary to control the speed of the stylus in a direction perpendicular to the average drift of the groove in proportion to all of the components which cause deflections in the groove. As a result, the component, due to the lateral deviation of the track for sound recording, is introduced into the system for controlling the cutting stylus in addition to those components already present and controlling the speed of the stylus. The regulation of the distance between two adjacent grooves, each groove providing a common track for both lateral and vertical recording, may be carried out in the following manner. The regulation is accomplished by four components, two components related to the two signals being recorded and two components related to the signals recorded in the preceding groove.

In reducing the present invention to practice, it has been found that the adjustment of the average depth of cut of the recording stylus also influences the temperature of the stylus. The act of recording sound signals in a vertical track causes the temperature of the cutting edges of the recording stylus to drop below the range considered necessary for the formation of proper sound grooves. This is undoubtedly true, because the deep penetration of the stylus into the recording medium increases the area of direct contact between the recording medium and the stylus. Consequently, the conduction of the heat from the stylus by the recording medium is considerably increased. This excess conduction of heat from the stylus not only arises in those cases where the depth of the penetration of the recording stylus in the zero or rest position is controlled, but it has also been observed in those cases, where the amplitudes of the signals to be recorded are high, even though the average depth of penetration remains constant. It is reasonable to assume that the heat losses are non-linear with respect to the depth of penetration of the stylus. The non-linear relationship would cause the heat losses to be increased when the average depth of penetration is increased, with the resulting increase being greater than it would be if the relationship were a linear one. This thermal phenomena may be observed when the average depth of penetration of the stylus in its zero or rest position is regulated in accordance with this invention. In this case, the heat conduction from the stylus increases when the average depth of penetration is increased, due to an expected increase in the amplitude of the signal to be recorded. In addition, it would be expected that the temperature of the cutting edges of the stylus would decrease in the case, where the generation of heat was constant, due to the increased conduction by the record medium of the heat from the cutting point.

It is an additional object of the present invention to provide a regulator for the temperature of the cutting stylus, which regulator cooperates with the control of the average depth of penetration. The temperature regulator for the stylus is so adjusted that high heat losses, due to a higher than average depth of penetration, are compensated by an additional supply of heat to the cutting stylus.

It has been mentioned above that the signal to be recorded on a disk is usually taken from an intermediate sound record medium, such as a magnetic tape. The control signals for regulating the average depth of penetration and also the speed of the recording stylus may also be taken from this intermediate record medium. However, it is necessary that the control signals be generated slightly in advance of the signal to be recorded, so that the control may be effective before the signals with changed amplitude have actually been recorded. This is to provide for the proper amount of space for the signal to be recorded on the disk.

One device for carrying out the invention may comprise a lifting magnet mechanically coupled to the recording head which carries the recording stylus. The lifting magnet may be electrically controlled. Thus, by electrical means the distance of the recording head from the surface of the record bearing medium, i.e., the average depth of penetration, may be controlled. The stylus, supported by the recording head, oscillates in accordance with the signal to be recorded, and the position of the recording head determines the zero position of the stylus, i.e., the average depth of penetration.

An adjustable braking means comprising, for example, hydraulic damping means as known in the art, may be provided for inhibiting the movement of the recording head. The device for directly controlling the distance of the recording head from the disk may be electrically connected to an amplifier which amplifies the control signals derived from the intermediate recording medium, for example, a magnetic tape, as has been mentioned above. In addition, the amplifier may also receive signals taken from the surface of the disk upon which the sound is being recorded. This second control signal may be generated by an electro mechanical transducer which uses a lever or other mechanical feeler for scanning the surface of the disk and in which the deflection of the lever is converted into a proportional electrical signal. The output of the amplifier may also be connected to a control member to regulate the heating of the recording stylus. For example, the output current of the amplifier may be fed into an exciting coil of a transformer having an iron core. An output coil of the transformer is connected as a variable impedance in an alternating current heating circuit for the stylus.

The recording head may be moved by an electrical motor connected to the output of an amplifier which is energized by a signal to be recorded somewhat later in a vertical recording track. The control signal should be rectified before energizing the amplifier. In addition, this last mentioned amplifier may also be energized by a signal derived in a manner similar to that mentioned above, but which is provided for a lateral movement in the track. The two control signals may be adjusted as to their individual contribution to the composite output signal of the amplifier which will be used to control the motor mentioned above. The difference in time between the derivation of the control signal and the derivation of the corresponding signals for the actual sound recording may be selected in such a manner, that each change in amplitude is sensed sufficiently early to furnish the proper space for the groove to be cut. There might also be provided another amplifier which is energized by a signal representing the preceding groove. The output of this amplifier may also be used to control the speed of the motor which, in turn, determines the movement of the recording head. The signal fed into the last mentioned amplifier also is rectified before it is supplied as a control signal. Further, this amplifier may also be controlled by signals which serve to record a lateral track, and also by a signal which serves to record a vertical track. Thus, the space necessary for one groove is properly adjusted to the space actually occupied by the preceding groove. In turn, the relative influence of the signals for vertical recording and those signals for lateral recording may each be adjustable.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
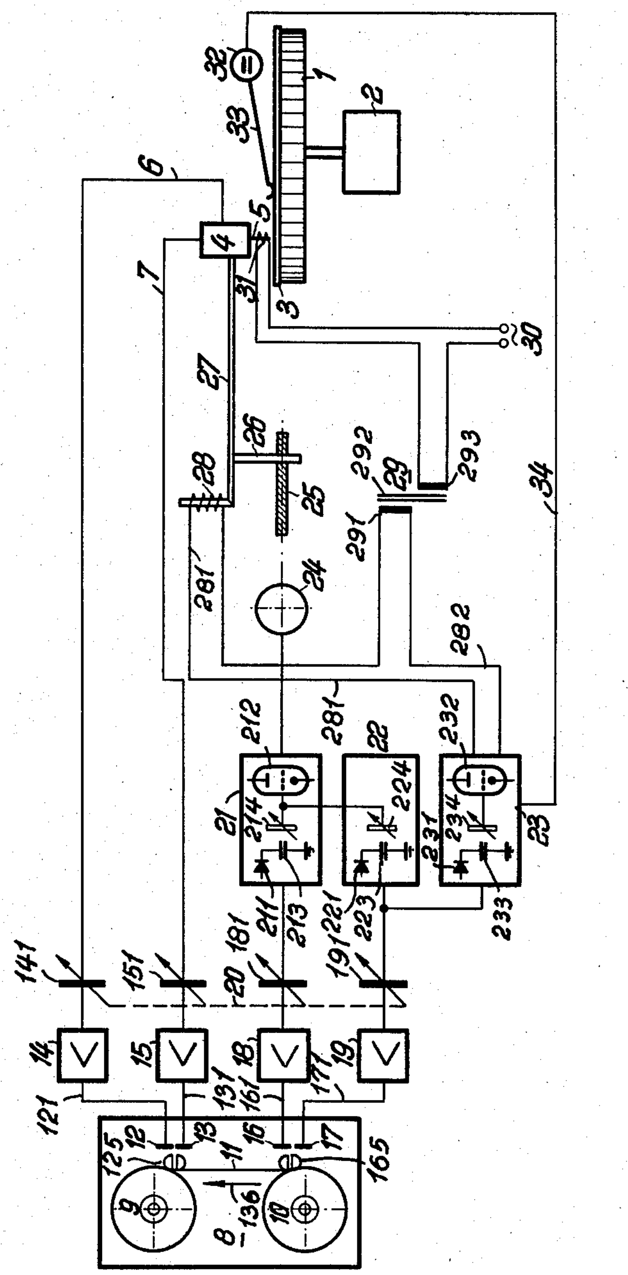
Figure 1 illustrates diagrammatically a device for controlling a recording head according to the principles of this invention.

Referring in more detail to the drawings and, more particularly, to Figure 1, the reference character 1 designates a turntable of a sound recording system. The turntable 1 is rotatably mounted and driven in rotation by a motor 2 of any conventional form. A recording disk 3 is mounted upon the turntable 1 and is driven thereby. The material of the disc may be of any suitable composition for good recording purposes. A recording head 4 is supported by any suitable means (not shown) adjacent the recording head 3 and in operative relationship therewith. It is to be understood that the recording head 4 is so mounted as to permit relative adjustment along the direction of the radius of the turntable 1. Supported by the recording head 4 is a recording stylus 5 which may be provided with a wedge-shaped edge formed of diamond or other suitable material.

Amplifiers 14 and 15, shown in Figure 1 in block form, are respectively connected by conductors 6 and 7 to the recording head for driving the recording stylus in response to signals to be recorded upon the disk 3. The amplifiers are of general construction and their outputs are electrical signals in the form of alternating currents having amplitudes varying in response to the amplitudes of the signals to be recorded and having frequency variations corresponding to the tones to be recorded. The recording stylus 5 is moved horizontally, as shown in Figure 1, by virtue of the signals transmitted from amplifier 14 through the conductor 6. The horizontal movement of the recording stylus 5 cuts a horizontal or lateral track on the recording medium 3. The output of the amplifier 15 controls the vertical oscillation of the recording stylus 5. The vertical oscillation of the recording stylus 5 results in a vertical cut or Edison recording on the record medium 3. A single common groove is formed for both the vertical and the horizontal oscillations, but the horizontal deflection and the vertical depth of the groove are different, and each represents a different sound signal as it appears at the output of the amplifier 14 and the amplifier 15.

It is common, in the recording of groove sound tracks, to employ an intermediate sound record, such as a magnetic tape, from which the actual sound to be recorded is taken. In Figure 1, a magnetic recorder 8 comprises supply reel 10 and a pickup reel 9 between which is moved a magnetic tape 11. The tape 11 moves in the direction of the arrow 136 past two separate recording or playback heads 125 and 165. The head 125 comprises pickup coils 12 and 13 and the head 165 comprises pickup coils 16 and 17. The movement of the prerecorded magnetic tape 11 induces in coil 12 a signal which is to be recorded in a horizontal manner on the record medium 3 and which is fed by conductor 121 to amplifier 14. The signal to be recorded in the vertical manner on the record medium 3 is induced by the magnetic tape 11 into the coil 13 and is conducted therefrom by line 131 to the input of amplifier 15. Since the tape 11 moves in the direction of the arrow 136, the signals are picked up by the recording head 165 before they reach the recording head 125. The coil 16 of the head 165 has induced therein control signals from the tape 11 which correspond to the actually recorded signals picked up at a later time by the coil 12 for horizontal recording. The coil 17 derives a control signal from those signals which are later induced in coil 13 for vertical recording on the recording medium 3. The output of the coil 16 is fed by means of a line 161 to an amplifier 18, and the output of the coil 17 is connected by a line 171 to the input of an amplifier 19. The level of the signals emanating from the amplifiers 14, 15, 18 and 19 may be simultaneously controlled by means of adjustable impedances 141, 151, 181 and 191, ganged together by means of a coupling 20. The adjustable impedances 141, 151, 181 and 191 may be of any suitable type known in the art, such as the common potentiometer type of resistor. Block 21 diagrammatically indicates a device which is adapted to supply signals for controlling the horizontal movement of the entire recording head 4. The device 21 comprises a rectifier 211 and an amplifier 212. The output of the rectifier 211 is filtered by a capacitor 213 which may also operate as an integrator to provide a direct voltage proportional to the amplitude of 1, 2 or more cycles of the signal derived from the tape 11. An input impedance to the amplifier 212 is designated by the reference character 214. The output of the amplifier 212 is connected into a servomotor 24 which drives a worm gear 25 upon which a follower, such as split nut 26, is supported. A bar 27, connected to the follower 26 to move therewith, is also connected to recording head 4 to move the head 4 toward the center of the turntable 1 in accordance with the rotation of the motor 24 and the worm 25.

A device 22, comprising a rectifier 221 and a capacitor 223 connected thereto, is employed to feed an additional signal from amplifier 19 to the input of the amplifier 212 of the device 21. The signal from the device 22 to the input of the amplifier 212 is a direct voltage having a varying amplitude, due to the unfiltered rectifier 221. As a result, the average horizontal movement of the recording head is determined by a composite signal comprising one component which represents the horizontal sound track and another component which represents the vertical sound track. Adjustable impedances 214 and 224 are provided in the devices 21 and 22, respectively, for proportioning the relative amplitudes and effectiveness of the two signals fed into the amplifier 212.

A device 23 is illustrated similarly to the devices 21 and 22, and comprises a rectifier 231, a filter condenser 233, a variable coupling impedance 234 and an amplifier 232. The input to the device 23 is derived from the amplifier 19. The output of the device 23 is fed to a lifting magnet 28 which is mechanically connected to the bar 27 and is adapted to exert a force to lift the entire recording head 4 for vertical adjustment purposes. By means of the magnet 28, the distance of the recording head 4 from the surface of recording disk 3 may be readily controlled. Consequently, the average depth of penetration of the stylus 5 is controlled by the magnet 28. The output of the amplifier 232 is connected to the magnet 28 by conductors 281 and 282. The primary winding 291 of a transformer 29 is connected in series with the output of the device 23 and the electromagnet 28 in the conductor 282. The secondary 293 of the transformer 29 is connected in series between a source of alternating current 30 and a heating winding 31 surrounding the stylus 5. The transformer 29 is in reality a magnetic impedance element and the current flow through the primary winding 291 controls the impedance inserted into the circuit of the alternating current source 30 and the heater 31 by the secondary winding 293. In this manner, the current flow through the heating coil 31 is controlled by the output of the amplifier 232.

An electro mechanical converter 32 is provided to measure the vertical deviation of the record receiver 3 during its rotation. The device 32 comprises a feeler 33 which is generally in the form of a lever and rests upon the record medium 3 closely adjacent the point of the stylus 5. The feeler 33 is mechanically connected to the transducer 32 which may be a piezoelectric device generating an electrical voltage proportional to its mechanical distortion. The electrical output of the transducer 32 is then proportional to the deflection of the lever 33 and this output is fed to an input of the amplifier 232 in the device 23. In this manner, the vertical deviation from a normal or datum position of the recording medium 3 during its rotation generates signals which serve to control both the vertical displacement of the entire recording head and the amount of heat applied to the cutting stylus 5. Since a piezoelectric device generates a current whose polarity is dependent upon the direction of distortion of the element, the output signal of the transducer 32 may be selected so as to increase with an upward deviation of the recording medium 3. With this type of an output, the voltage applied by the transducer 32 to the input of the amplifier 232 would subtract from, or oppose, the signal from the rectifier 231. Thus, one signal input to the amplifier 232 would act as a compensating signal for the other variations to the input of amplifier 232. In addition, hydraulic damping devices (not shown) may be employed to control the movement of the recording head 4 and avoid excessive transient motions.

As mentioned above, any point on tape 11 moves past the recording head 165 prior to reaching the recording head 125. Consequently, the signals in the circuits 21, 22 and 23 are available immediately prior to the corresponding sound signals which are to be recorded by the recording stylus 5.

One device omitted from the drawings, in order to avoid unduly confusing them, is a means for sensing the space occupied by the preceding groove in the record medium 3. Such a device would be similar to the circuits 21, 22 and 23, but would be connected to a device adapted to read the tape 11 subsequent to its passage by the head 165. This reading would occur at a time subsequent to the passage of the tape by head 165 which is equivalent to the time necessary for one complete revolution of the recording medium 3. The motor 24 would then also be responsive to this signal which represents the recording made one revolution earlier.

The record 3 may be used as a master from which subsequent pressings are made. By means of electroplating, negative copies are made from the master and exact copies may be pressed from the negatives. It is, however, quite common to use the exact copies produced from these negatives as masters to form additional negatives and these last mentioned negatives are finally utilized for the pressing of the innumerable copies of the records that are required for commercial distribution. This final product is an exact copy of the master record if every one of these copying steps are carefully performed. Records made by means of the method outlined above and in accordance with this invention have some characteristics, whereby they may be distinguished from records made according to ordinary methods.

Figure 4:
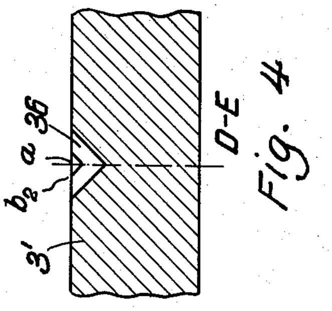
Figure 4 illustrates schematically, in section, another portion of the record medium of Figure 2, taken along the line D—E.
Figure 3:
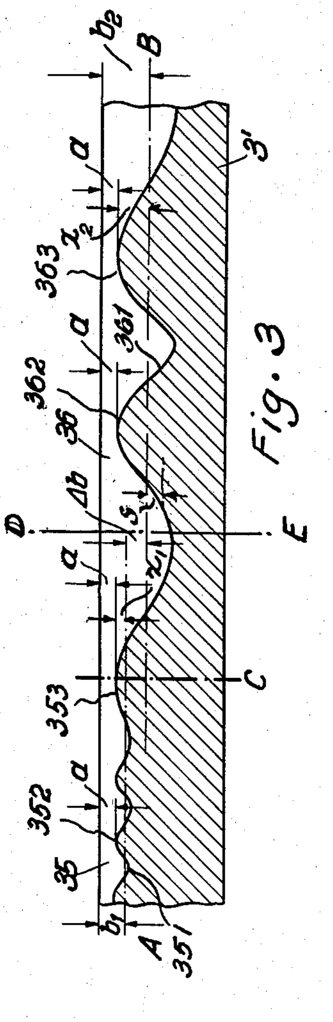
Figure 3 illustrate schematically, in section, the record medium taken along the line A—B.
Figure 2:
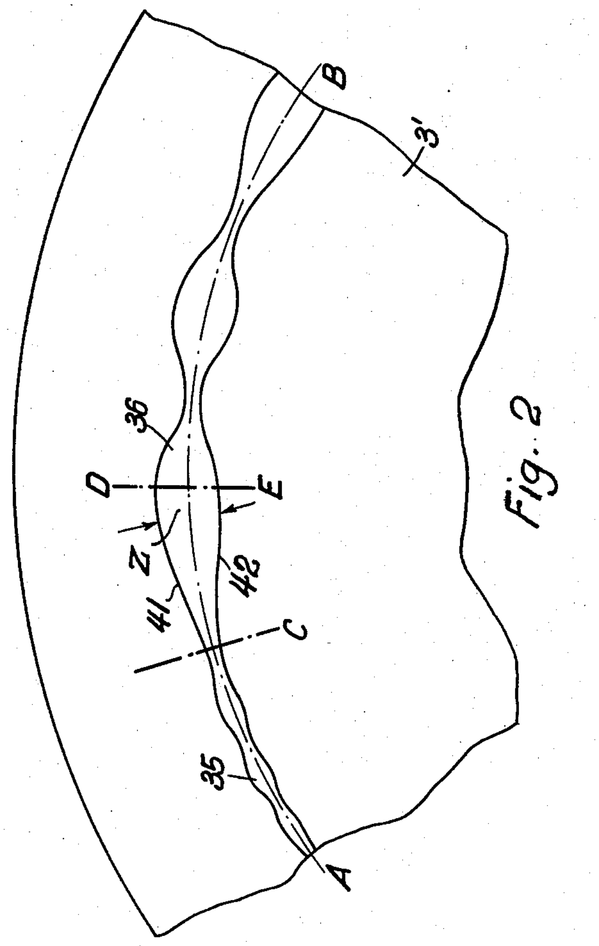
Figure 2 illustrates schematically a portion of a record disk which carries a groove made in accordance with the basic principles of this invention.

Figures 2 to 12 illustrate some of the records produced by utilizing the present invention. Reference is now made to Figures 2, 3 and 4 and, in the discussion of these figures, it will be carefully explained how the application of this invention may form recognizable and distinctive record grooves.

Of these figures, the numeral 3' indicates a record disk which may be similar to that of Figure 1, or it may be a copy of such a master disk. The left portion of the shown track is designated by the numeral 35, while the right portion of the same track is designated by the numeral 36, the dividing line being labeled C. In Figure 3, the reference character 351 designates the bottom or the center portion of the groove of the left hand portion 35, and 361 indicates the bottom of the right hand portion 36. Figure 2 shows the groove 35 and 36 as it appears at the surface, the upper edge of the groove being designated 41 and the lower edge of the groove, as shown in Figure 2, being designated 42. As can be seen from the drawings, the bottom 351 of the lefthand portion 35 does not vary to any great extent, but the bottom 361 of the right-hand side 36 varies greatly in its amplitude. It can be seen from Figures 2 and 3 that these different proportions of the groove also have different average depth. Thus, that portion of the groove representing a signal of small amplitude (35) has a small average depth, whereas the portion representing a signal of large amplitude (36) has a relatively large average depth. From Figure 3, it can be seen that the average depth $b_1$ of the groove portion 35, which represents signals of low amplitude, is much less than the average depth $b_2$ of the right portion 36 which represents signals of greater amplitude. The difference $b_2—b_1$ is indicaed as $\Delta b$ in Figure 3. As a general rule, the average depth of the groove increases with the change from a small to a large signal amplitude of a recording. The increase of the average depth is proportioned in such a manner, that the flattest portions of the groove (352, 353, 362, 363), i.e., the minimum depth cut by the stylus, remains constant everywhere in the groove. This is indicated by the distance "*a*" which is constant for all of those shallow portions and is independent of the average depth of the groove.

This could better be explained with a reference to Figure 1. The groove shown in Figure 2 comprises only a vertical track. This means that the devices 12 and 16 are not being used, but that the control of the cutting head 4 is entirely dependent upon the vertical signals and the control signals derived therefrom.

The electromagnet 28 obtains a lifting or lowering control signal which is preferably exactly equal to the amplitude of the vertical signal to be recorded by the stylus 5. The recording head 4 is preadjusted so that, in the event of zero amplitude, the groove cut by the stylus 5 has the depth "*a*" shown in Figure 2. If a signal having the amplitude $x_1$ is now to be recorded, the position of the recording head is lowered, so that the average depth of cut is now $a+x_1=b_1$. If the amplitude of the signal increases farther to the value of $x_2$, the recording head will be lowered by an amount equal to $x_2-x_1$ and the average depth of penetration is now $b_2=a+x_2$. It should be understood that the values $x_1$ and the value $x_2$ are the amplitudes of the signals to be recorded, as well as the distance for which the recording head should be lowered under the circumstances. The amplifier 19 and the device 23 provide for such occurrence which will energize the magnet 28 so that the desired negative lift $x_1$ or $x_2$ is performed. The influence of the feeler 33 upon the control device 23 does not change this, because it only keeps the relative distance between the recording head and the record 3 constant and does not change the values for the average depth of penetration $b_1$ or $b_2$.

The groove illustrated in Figure 2 shows that the lateral space to be occupied by a groove increases not only directly with the momentary amplitude of the recorded signals, but also with the increase of the average depth. This can be seen by comparing the depth and width of the groove at the line DE with the width and depth of the groove at the line C. Thus, it can be seen that the lateral space requirements of a groove increase twice with amplitude of the signal being recorded.

Figures 5, 6, 7, 8:
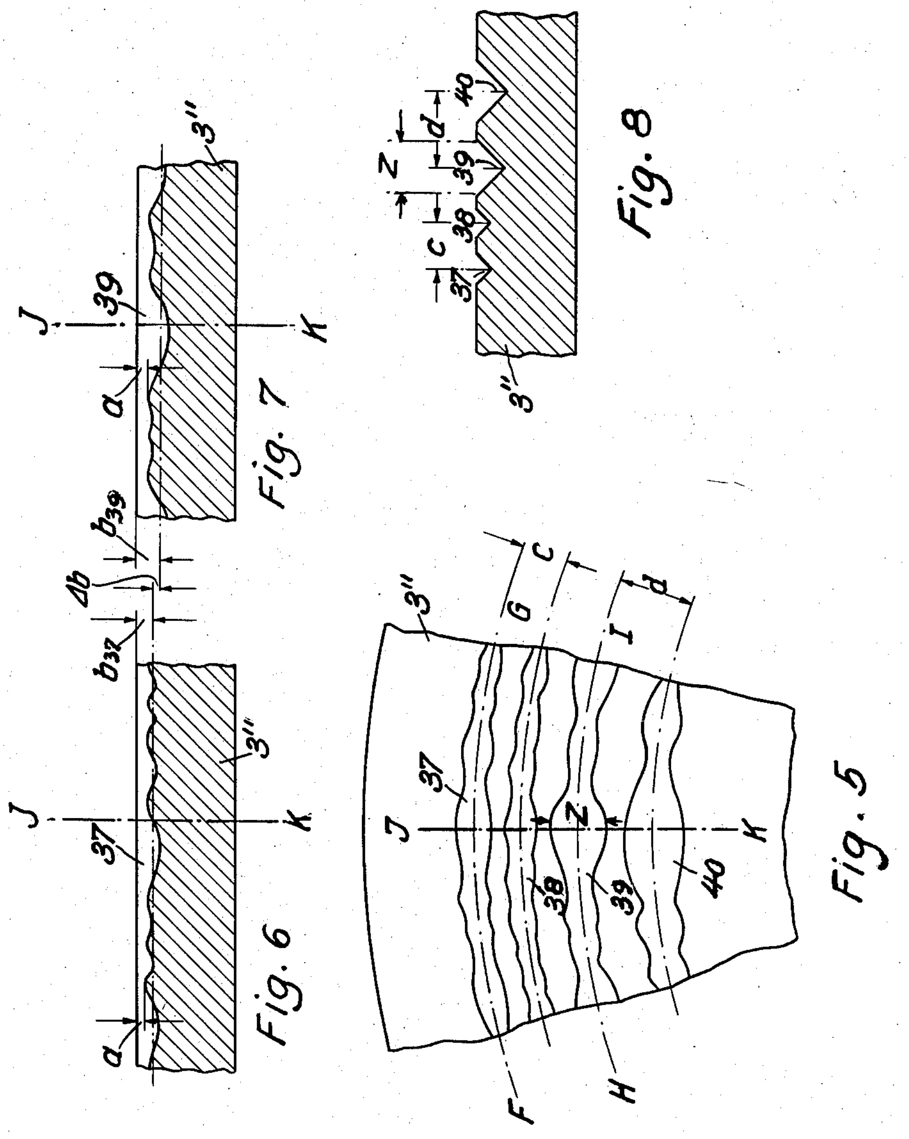
Figure 5 shows schematically a portion of a record receiver bearing grooves recorded therein in accordance with the principles of this invention.
Figure 6 shows schematically, in section, a portion of the record medium of Figure 5, taken along the line F—G.
Figure 7 illustrates schematically, in section, another portion of the record medium shown in Figure 5, taken along the line H—I.
Figure 8 shows schematically another section of the record bearing medium of Figure 5, taken along the line J—K.

Figures 5 to 8 illustrate how the last mentioned characteristic of the groove influences other grooves on the same disk. Figure 5 shows four grooves 37, 38, 39 and 40 which are cut into a record receiver 3''. The grooves 37 and 38 represent signals of low amplitude and the grooves 39 and 40 represent signals of high amplitude. The average depth of the grooves 37 and 38 is smaller than the average depth of the grooves 39 and 40. The average depth $b_{37}$ of groove 37 and the average depth of $b_{39}$ of groove 39 are shown in Figures 6 and 7. Figure 6 is a longitudinal section taken along the groove 37 and Figure 7 is a longitudinal section taken along the groove 39. The difference in depth between the grooves 39 and 37, $b_{39}-b_{37}$, is indicated on the figures as $\Delta b$. Figure 8 is a section taken through the recording medium 3'' along a radius thereof, and illustrates the difference in the spacing of the center lines between the grooves of deep amplitudes and those which are shallow. In Figure 8, the letter $c$ represents the space between the center line of the groove 37 and the groove 38, both of which are shallow, and the letter $d$ represents the space between the center line of the groove 39 and the groove 40, both of which are deep. Thus, it is shown in Figure 8 that distance $d$ is greater than the distance $c$ and that the space occupied by two deep grooves is much greater than that occupied by two shallow grooves. This space occupancy of grooves is independent of whether the recording process has been from the outside of the record in towards the center or from the center of the disk out towards the rim.

Further explanation of the Figures 2 to 8 should be made with reference again to Figure 1. It still may be assumed that the elements 16 and 12 are not in use. The amplifier 212 is controlled solely by the output of the device 22 and the amplifier 212 will control the motor 24 in conformance with the following relationship. If, in Figure 8, Z is the surface width of the groove 39 and the depth at the point is $b$, the relationship between the two will always be $z=gxb$, where $g$ is a constant factor dependent upon the size of the particular wedge-shaped stylus used. Thus, the width of the groove at any particular point may be Z, the vertical deflections of the recording stylus may be $s$, the average amplitude may be $x$, and the average depth of penetration will then be $x+a$. The total width of the groove is now easily derived, i.e., it is $z=g\ (x+a+e)$. The vertical movement $s$ of the stylus varies between $+x$ and $-x$ and, consequently, the maximum width is $Z_{\max}=g(x+a+x)=g(2x+a)$, and the minimum width may be represented as $Z_{\min}=g(x+a-x)=ga$. The speed of the motor 24 must be so controlled that, after one complete revolution of the turntable 1, the recording head 4 has been shifted inwardly along the disk by at least the amount $Z=ga$. The amount by which this inward shift must increase over that of the above equation may be a constant one or may be a value which is controlled by the previous groove, as outlined above. Figures 9 to 12 illustrate portions of a recording medium which bears grooves recorded by both lateral and vertical recordings. Such composite grooves are preferably used for stereophonic sound recording.

Figures 9, 10, 11, 12:
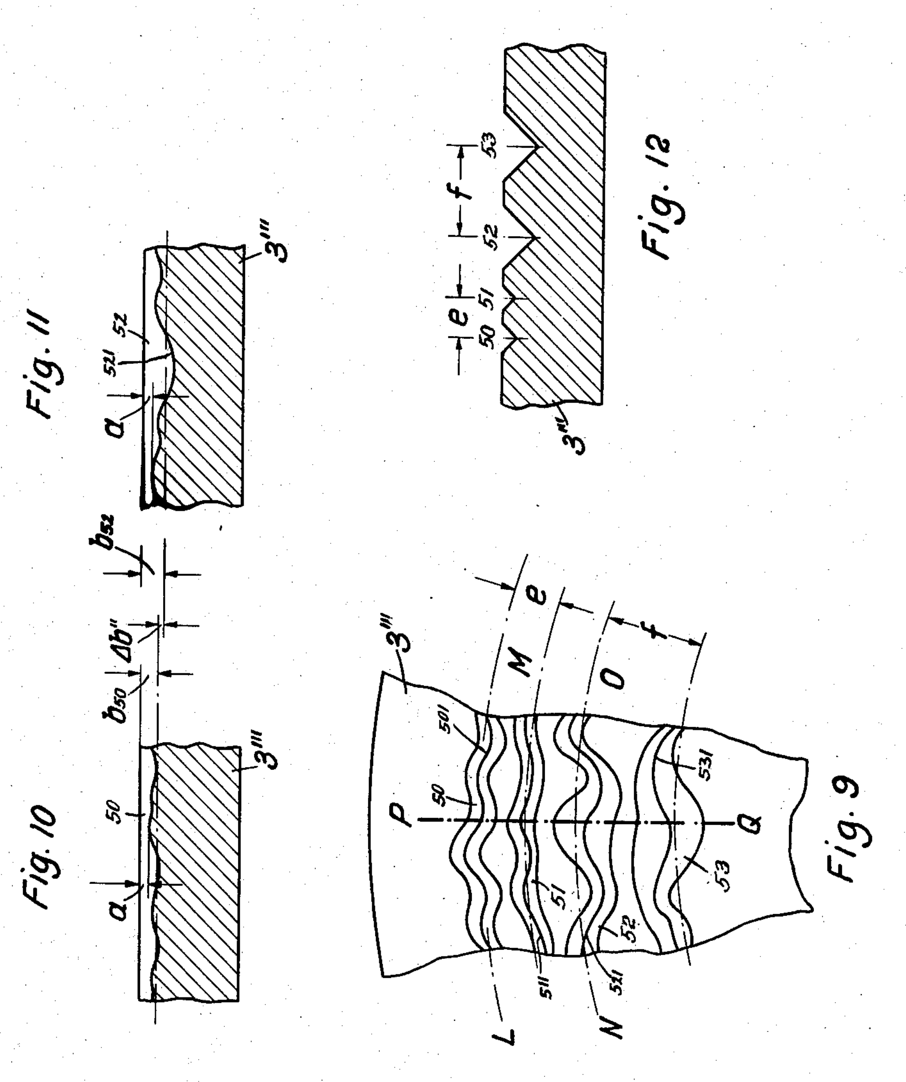
Figure 9 illustrates schematically a portion of a record disk bearing four tracks of combined lateral and vertical sound recordings.
Figure 10 illustrates schematically, in section, a portion of the record bearing disk of Figure 9, taken along the line L—M.
Figure 11 illustrates schematically, in section, a portion of the disk of Figure 9, taken along the line N—O.
Figure 12 shows schematically, in section, a portion of the record bearing medium of Figure 9, taken along the line P—Q.

In Figure 9, there are shown portions of four grooves 50, 51, 52 and 53. The grooves 50 and 51 contain a lateral recording which is of small amplitude and also a vertical recording of small amplitude. Grooves 52 and 53 have larger amplitude recordings of both lateral and vertical form. Accordingly, the average depths of the grooves 50 and 51 are much less than the average depths of the grooves 52 and 53. This is shown more clearly in Figures 10 and 11, which illustrate the depth of grooves 50 and 52, respectively. In these figures, the average depth of the groove 50 is denoted by the reference character $b_{50}$ and the average depth of the groove 52 is denoted by the reference character $b_{52}$. Figure 9 also illustrates the fact that the distance between the average traces of two adjacent grooves is equal to a given sum, one of the terms of the sum being dependent upon the average depth of penetration of the later recorded track, the other term of the sum being dependent upon the average amplitude of the lateral signal. Groove 50 is the first one recorded and groove 53 is the last. The average distance between the grooves 50 and 51 is indicated by the letter $e$, while the letter $f$ is used to designate the average distance between the grooves 52 and 53. These distances are also illustrated in Figure 12, which is a section taken along the radius of Figure 9. It should be remembered that the distances $e$ and $f$ are average distances between the center lines of the grooves and are not local instantaneous distances. The center lines are labeled 501, 511, 521 and 531 for the grooves 50, 51, 52 and 53, respectively. From Figures 10 and 11, it can be derived that the difference between the distances $e$ and $f$ is basically determined by two factors. The first factor is the increase in the lateral space required for a groove, due to an increase of the average depth of that groove from a depth of $b_{50}$, for example, to a greater depth of $b_{52}$, for example, the other factor being the increase from the small lateral deviation of groove 51, for example, to the larger lateral amplitude of the groove 53.

In a system wherein a single track contains both the lateral and the vertical type of recording, the system depicted in Figure 1 is used in its entirety. As explained earlier in this description, the control signal derived by the pickup of coils 16 and 17 in the head 165, is slightly modified by the devices 20, 21, 22 and 23, and is used to determine the final lateral dispositions of the recording head 4 and also its vertical orientation for both lateral and vertical simultaneous recording. The sound signals for the vertical and the lateral recording are derived from the tape 11 by the pickup coils 12 and 13 of the head 125 and these signals are transmitted over conductors 6 and 7 to the recording head 4. The signals derived from the head 165 serve to orient the cutting stylus 5, so that, when the signals are actually being recorded by the stylus 5, a minimum of waste space on the record medium 3''' is achieved while, at the same time, insuring a sufficient depth of cut for positive tracking upon playback.

The above description has clearly set forth a novel method of recording sound signals, new apparatus for producing improved sound signals and a new and improved recording which has a more efficient utilization of available recording space while, at the same time, guaranteeing fidelity of reproduction and positive tracking ability upon playback. Although, a specific example has been given of the means and method for carrying out the principles of this invention, it is not intended that this invention should be limited in any manner by the specific devices described herein, but only by the scope of the appended claims.

What is claimed is:

1. Apparatus for recording sound tracks on a record receiver, said apparatus comprising means for rotating a record receiver, a recording head adapted to move in a direction perpendicular to the surface of a rotating record receiver, a recording stylus carried by said recording head and adapted to oscillate in the direction of movement of said recording head, an intermediate sound recording means to derive from said intermediate sound recording signals to be recorded by said recording stylus, means to derive control signals from said intermediate sound recording, means to control the average depth of cut of said stylus in response to said control signals, said means to derive control signals generating an output voltage proportional to the amplitude of the sound signals on said intermediate recording, said means to control the average depth of cut including an amplifier and an electromagnet lift means, said amplifier receiving said control voltage and energizing said lift means, said lift means being mechanically coupled to said recording head, and means positioned on said stylus for electrically heating said stylus in response to the output from said amplifier.

2. Apparatus for recording sound tracks on a record receiver, said apparatus comprising means for rotating a record receiver, a recording head adapted to move in a direction perpendicular to the surface of a rotating record receiver, a recording stylus carried by said recording head and adapted to oscillate in the direction of movement of said recording head, an intermediate sound recording means to derive from said intermediate sound recording signals to be recorded by said recording stylus, means to derive control signals from said intermediate sound recording, said means to derive control signals generating an output voltage proportional to the amplitude of the sound signals recorded on said intermediate sound recording, means to control the average depth of cut of said stylus in response to said control signals, said means to control the depth of cut including an amplifier and an electromagnet lift means, said amplifier receiving said control voltage and energizing said lift means, said lift means being mechanically coupled to said recording head, a variable impedance element having a primary winding and a secondary winding inductively coupled together, means for connecting said primary winding to the output of said amplifier, an electrical heating means, and means for connecting a source of alternating current to said heating means through said secondary winding, the impedance of said secondary winding being controlled by the energization of said primary winding.

3. An apparatus for recording sound tracks on a record receiver by means of a heated cutting stylus, said apparatus comprising means for determining the average depth of penetration of the stylus in substantially linear relation to the amplitude of the signal being recorded, and means for controlling the heating of the stylus in proportion to the amplitude of the signal being recorded to compensate for differences in heat loss therefrom due to the varying depth of cut.

4. The apparatus defined in claim 3, wherein said means for controlling the heating of the stylus includes an amplifier for amplifying signals proportional to the signals being recorded, an impedance, means for supplying energy for heating purposes to the stylus through said impedance, and means for controlling the value of said impedance by the output from said amplifier.

5. The apparatus defined in claim 4, further including means for controlling the stylus in two directions by the use of two sound signals to produce a single sound groove having two sound signals recorded therein, whereby the depth of penetration of the stylus is dependent upon the amplitudes of both of the sound signals.

References Cited in the file of this patent

UNITED STATES PATENTS

| | | |
|---|---|---|
| 2,112,699 | Kleber | Mar. 29, 1938 |
| 2,284,744 | Kellogg | June 2, 1942 |
| 2,738,385 | Bachman | Mar. 13, 1956 |
| 2,828,599 | Hardl | June 10, 1958 |
| 2,847,514 | Evans | Aug. 12, 1958 |